United States Patent
Trusten et al.

(10) Patent No.: US 9,838,594 B2
(45) Date of Patent: Dec. 5, 2017

(54) IRREGULAR-REGION BASED AUTOMATIC IMAGE CORRECTION

(71) Applicant: QUALCOMM Incorporated, San Diego, CA (US)

(72) Inventors: Matthew Trusten, San Diego, CA (US); Narayana Karthik Sadanandam Ravirala, San Diego, CA (US); Adarsh Abhay Golikeri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/059,097

(22) Filed: Mar. 2, 2016

(65) Prior Publication Data

US 2017/0257557 A1  Sep. 7, 2017

(51) Int. Cl.
*H04N 5/232* (2006.01)
*G06T 5/50* (2006.01)

(52) U.S. Cl.
CPC .......... *H04N 5/23216* (2013.01); *G06T 5/50* (2013.01); *H04N 5/23212* (2013.01); *H04N 5/23222* (2013.01); *H04N 5/23293* (2013.01); *G06T 2207/10148* (2013.01); *G06T 2207/20104* (2013.01)

(58) Field of Classification Search
CPC . G02B 7/36; H02B 7/38; G03B 13/36; H04N 5/23212
See application file for complete search history.

(56) References Cited

U.S. PATENT DOCUMENTS

| | | | |
|---|---|---|---|
| 7,664,384 B2 | 2/2010 | Hope | |
| 8,249,391 B2 | 8/2012 | Curtis | |
| 8,259,208 B2 | 9/2012 | Ciurea et al. | |
| 8,452,105 B2 | 5/2013 | Pettigrew et al. | |
| 8,885,977 B2 | 11/2014 | Warner | |
| 2003/0025821 A1* | 2/2003 | Bean | H04N 5/23212 348/348 |
| 2005/0177315 A1 | 8/2005 | Ghosh | |
| 2006/0153472 A1* | 7/2006 | Sakata | H04N 5/23248 382/255 |
| 2007/0222859 A1 | 9/2007 | Chang et al. | |

(Continued)

OTHER PUBLICATIONS

International Search Report and Written Opinion—PCT/US2017/012701—ISA/EPO—Apr. 4, 2017.

*Primary Examiner* — Amy Hsu
(74) *Attorney, Agent, or Firm* — Knobbe, Martens, Olson & Bear, LLP

(57) ABSTRACT

Methods and apparatuses for irregular-region based automatic image correction are disclosed. In one aspect, the method is operable by an imaging device including a touch sensor, for performing image correction. The method can include obtaining a first image of a scene and receiving, via the touch sensor, a touch input indicating a selected region of the first image and having a shape that corresponds to a shape of the selected region. The method can also include determining statistics indicating visual properties for the selected region, adjusting at least one image correction parameter of the imaging device based on the determined statistics and the shape of the touch input, and obtaining a second image of the scene based on the adjusted at least one image correction parameter of the imaging device.

22 Claims, 10 Drawing Sheets

(56) References Cited

U.S. PATENT DOCUMENTS

| | | | |
|---|---|---|---|
| 2009/0225226 A1* | 9/2009 | Kakuta | H04N 1/608 |
| | | | 348/655 |
| 2010/0020221 A1 | 1/2010 | Tupman et al. | |
| 2013/0155276 A1 | 6/2013 | Ueda | |
| 2013/0300917 A1* | 11/2013 | Yata | G02B 7/36 |
| | | | 348/349 |
| 2014/0232927 A1* | 8/2014 | Kawai | G02B 7/36 |
| | | | 348/347 |
| 2014/0247368 A1 | 9/2014 | Chinn | |
| 2015/0035855 A1 | 2/2015 | Kim et al. | |
| 2016/0044228 A1* | 2/2016 | Kim | H04N 5/2258 |
| | | | 348/345 |

* cited by examiner

IRREGULAR-REGION BASED AUTOMATIC IMAGE CORRECTION

TECHNICAL FIELD

The present application relates generally to digital image processing, and more specifically, to methods and systems for improving digital image correction.

BACKGROUND

Imaging device, such as digital cameras, may perform automatic image correction(s) on captured images in order to increase the quality of the captured images without significant user intervention. Automatic image correction may involve, for example, 3A image correction functions (i.e., auto exposure, auto white balance, and auto focus). For example, 3A image correction may be based on the entire captured image, the auto-detection of objects within the image, or the selection of a point within the image by a user. Such approaches to image correction may be affected by the manner in which a region-of-interest is selected for 3A image correction. In this context, there remains a need for further control over image correction based on improvements to the selection of regions-of-interest.

SUMMARY

The systems, methods and devices of this disclosure each have several innovative aspects, no single one of which is solely responsible for the desirable attributes disclosed herein.

In one aspect, there is provided a method, operable by an imaging device including a touch sensor, for performing image correction. The method can comprise obtaining a first image of a scene; receiving, via the touch sensor, a touch input indicating a selected region of the first image and having a shape that corresponds to a shape of the selected region; determining statistics indicating visual properties for the selected region; adjusting at least one image correction parameter of the imaging device based on the determined statistics and the shape of the touch input; and obtaining a second image of the scene based on the adjusted at least one image correction parameter of the imaging device.

In another aspect, there is provided an imaging device, comprising an image sensor; a display; a touch sensor; at least one processor; and a memory storing computer-executable instructions for controlling the at least one processor to: obtain a first image of a scene from the image sensor; and control the display to display the first image; receive, from the touch sensor, a touch input indicating a selected region of the first image and having a shape that corresponds to a shape of the selected region; determine statistics indicating visual properties for the selected region; adjust at least one image correction parameter of the imaging device based on the determined statistics and the shape of the touch input; and obtain a second image of the scene based on the adjusted at least one image correction parameter of the imaging device.

In yet another aspect, there is provided an apparatus comprising means for obtaining a first image of a scene; means for receiving a touch input indicating a selected region of the first image and having a shape that corresponds to a shape of the selected region; means for determining statistics indicating visual properties for the selected region; means for adjusting at least one image correction parameter of an imaging device based on the determined statistics and the shape of the touch input; and means for obtaining a second image of the scene based on the adjusted at least one image correction parameter of the imaging device.

In still another aspect, there is provided a non-transitory computer readable storage medium having stored thereon instructions that, when executed, cause a processor of a device to: obtain a first image of a scene; receive, via a touch sensor, a touch input indicating a selected region of the first image and having a shape that corresponds to a shape of the selected region; determine statistics indicating visual properties for the selected region; adjust at least one image correction parameter of an imaging device based on the determined statistics and the shape of the touch input; and obtain a second image of the scene based on the adjusted at least one image correction parameter of the imaging device.

DETAILED DESCRIPTION

Figure 1A:
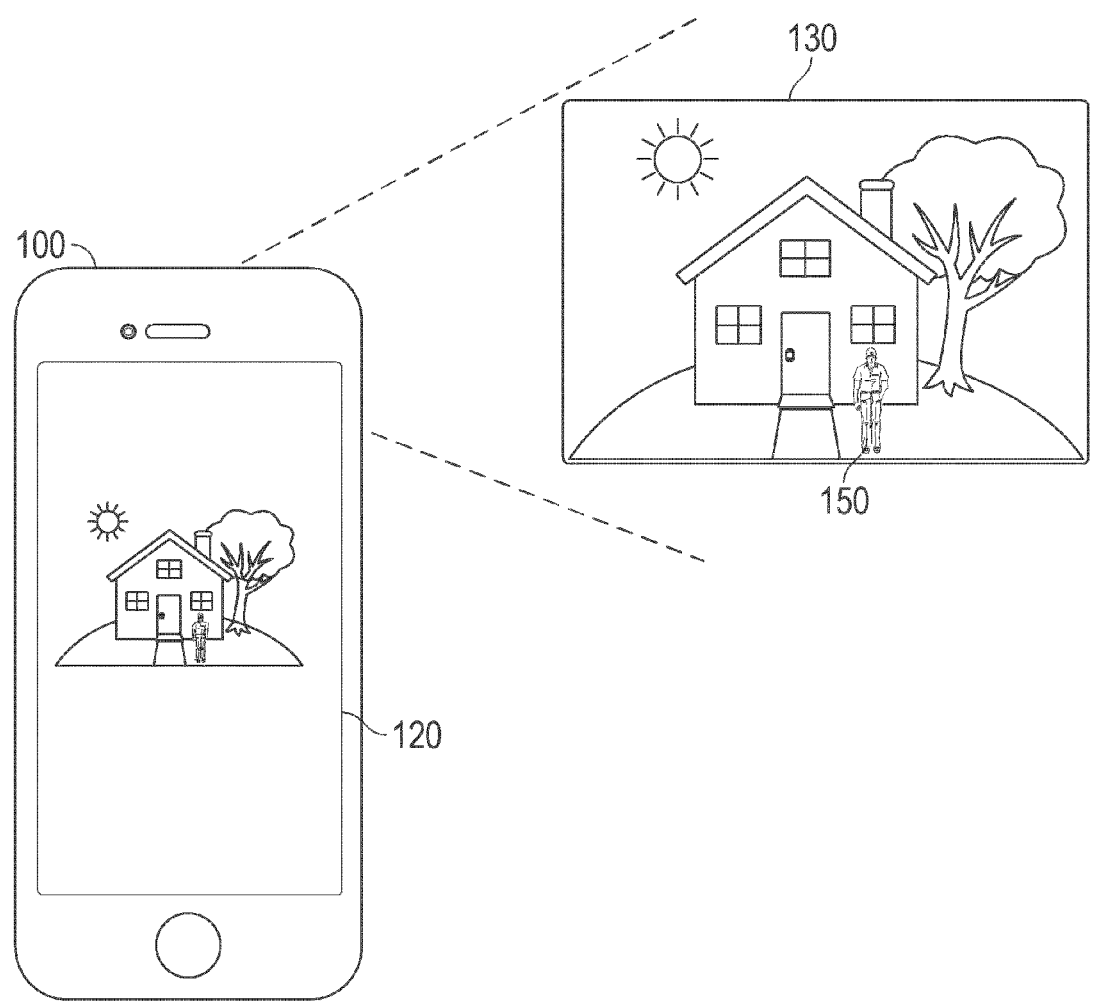
FIG. 1A illustrates an example of an apparatus (e.g., a mobile communication device) that includes an imaging system that can record images of a scene in accordance with aspects of this disclosure.

Digital camera systems or other imaging devices may perform various automatic processes to correct or adjust visual properties of a captured image. The image correction may include, for example, 3A image correction functions (auto exposure, auto white balance, and auto focus). The digital camera may determine visual statistics related to the current image correction function and use the determined statistics as feedback in the determination of a corrective value to adjust image correction parameters of the digital camera system. For example, in the case of auto focus, the statistics may relate to a focus value of the captured image. The digital camera may then adjust a position of a lens of the camera, re-determine the focus value, and re-adjust the position of the lens until an optical focus value has been obtained.

The auto focus algorithm may involve optimizing the focus value for the entire captured image. Since the focus of objects within the image may be based on the respective distances of the objects from the lens of the camera (also referred to as the depth of the objects), when objects are located at different distances they may not all be within focus for a given lens position. Auto focus methods which optimize the focus value for the entire image may produce acceptable focus for scenes where the majority of objects are at similar depths (e.g., a principal focal depth). However, a user of the camera may not be able to focus on objects that are not at the principal focal depth using this auto focus method.

There are a number of variations of the auto focus algorithm which may address the above limitations. In one such method, the auto focus algorithm may place more emphasis on a center of the captured image. Thus, the user may be able to select a focus depth by positioning a desired object at the center of the image captured by the camera. However, this method does not enable the user to automatically focus the image on objects that are not at the center of the image.

In another implementation, the camera may accept input from the user indicating a location of the image at which to perform auto focus. The user may select a location within the image and the camera may autofocus based solely on or heavily weighted on a region corresponding to the user's selected location. In one example, the user may input the selected location via touch input. This may enable the user to select an object for auto focus that is not at the center of the image or at a principal focal depth of the image. However, this implementation may have the limitation that the user may only be able to select a single location of fixed size and shape. Certain objects having irregular shapes or multiple objects cannot be selected for auto focus using this method.

In yet another implementation, the camera may accept multiple locations from a user to find one or more optimal focus values based on the selected multiple locations. Accordingly, the user may select multiple regions on which the camera performs auto focus. In order for the camera to focus on each of the selected regions, the camera may be required to capture multiple images at each of the focal depths corresponding to the selected regions or the camera may include redundant hardware components for simultaneously capturing images at differing focal depths.

Each of the above-described auto focus implementations may be limited in the ways in which the user may select locations of the image for auto focus. For instance, the user may only be able to select a fixed area and fixed shape region that may be used by the camera in performing auto focus. Accordingly, such limited information prevents a processor of the camera system from performing more advanced auto focus techniques that may more accurately focus on objects of interest to the user. It may also be difficult for the user to select an object which has a larger size than the defined size and shape of the selected locations. For example, when using a touch input sensor, it may be awkward for the user to select multiple locations which are close together in order to select a larger object. Additionally, the combination of the selected locations may be larger than the object desired to be selected by the user, which may result in inaccurate auto focus processing.

Although the above has been discussed in connection with an auto focus implementation of image correction, this disclosure may also be applied to other auto image correction techniques, such as auto exposure and auto white balance. The statistics and feedback values determined by the processor may correspond to the specific auto image correction applied. For example, in auto exposure, the statistics determined by the processor may relate to the brightness, contrast, etc. of the captured image. The statistics may be used as feedback by the processor to control at least one of an aperture size or a shutter speed of the camera in order based on the statistics to perform the auto exposure. Similarly, in auto white balance the processor may determine the color temperature of the image based on the selected location. The processor may alter the captured image based on the determined color temperature to compensate for the lighting of the scene. Other image correction algorithms may also be performed within the scope of this disclosure.

The following detailed description is directed to certain specific embodiments. However, the described technology can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1A illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1A shows an object 150 (e.g., a person) within the field of view 130 which may be captured by the camera. A processor within the apparatus 100 may perform automatic image correction of the captured image of the scene based on measured values associated with the captured image.

The apparatus 100 may perform various automatic processes to correct visual properties of the image. In one aspect, the apparatus 100 may perform auto image correction, including one or more of auto focus, auto exposure, and auto white balance, based on a region of the image selected by the user. Aspects of this disclosure may relate to techniques which allow a user of the apparatus 100 to select irregular regions (e.g., regions having a shape and size determined by the user at the time of selection) of the image to be used as feedback during the auto image correction.

Figure 1B:
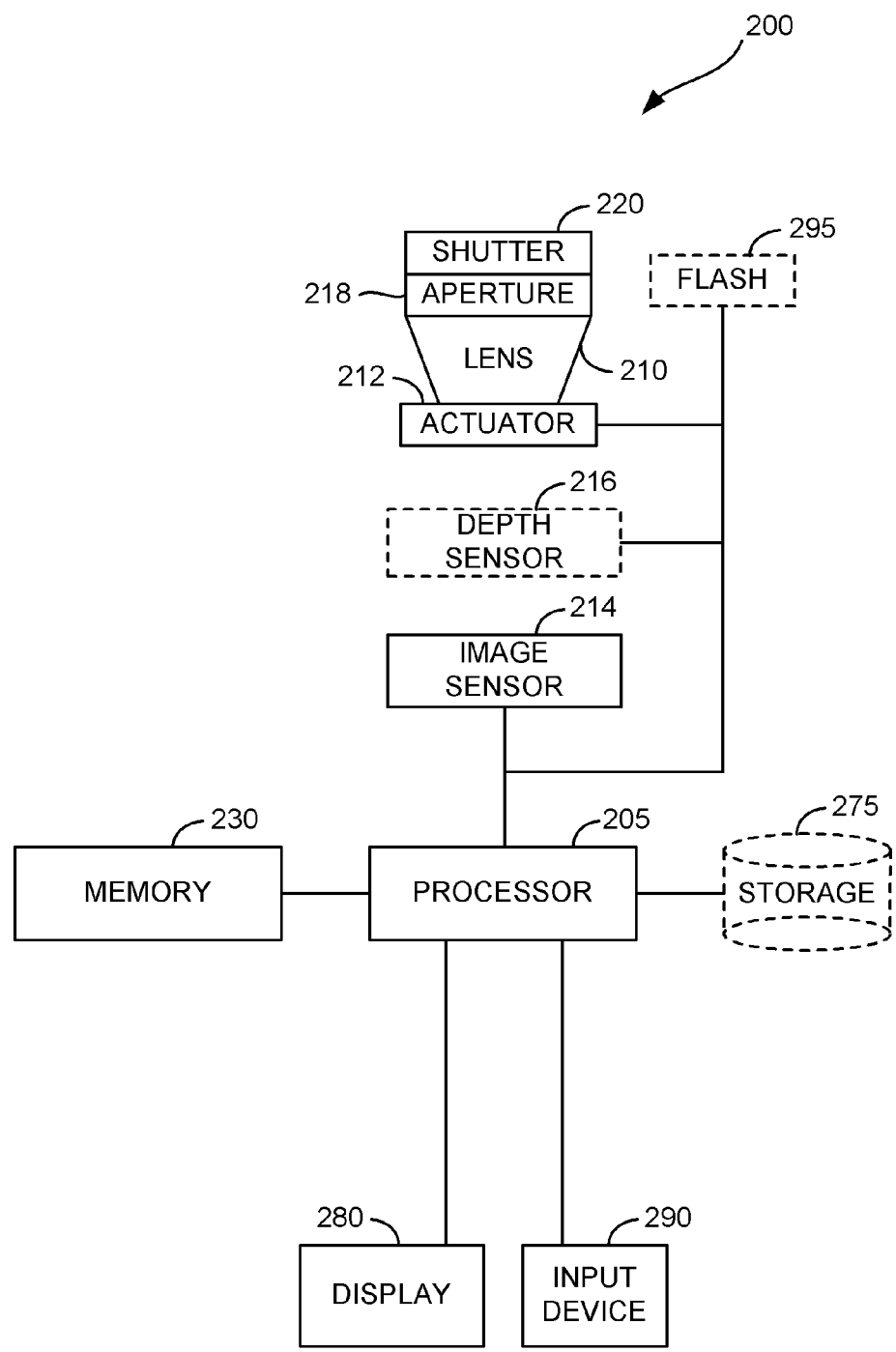
FIG. 1B is a block diagram illustrating an example of an imaging device in accordance with aspects of this disclosure.

FIG. 1B depicts a block diagram illustrating an example of an imaging device in accordance with aspects of this disclosure. The imaging device 200, also referred herein to interchangeably as a camera, may include a processor 205 operatively connected to an image sensor 214, an optional depth sensor 216, a lens 210, an actuator 212, an aperture 218, a shutter 220, a memory 230, an optional storage 275, a display 280, an input device 290, and an optional flash 295. In this example, the illustrated memory 230 may store instructions to configure processor 205 to perform functions relating to the imaging device 200. In this example, the memory 230 may include instructions for instructing the processor 205 to perform image correction in accordance with aspects of this disclosure.

In an illustrative embodiment, light enters the lens 210 and is focused on the image sensor 214. In some embodiments, the lens 210 is part of an auto focus lens system which can include multiple lenses and adjustable optical elements. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The actuator 212 is configured to move the lens 210 in a series of one or more lens movements during an auto focus operation, for example, adjusting the lens position to change the focus of an image. When the lens 210 reaches a boundary of its movement range, the lens 210 or actuator 212 may be referred to as saturated. In an illustrative embodiment, the actuator 212 is an open-loop voice coil motor (VCM) actuator. However, the lens 210 may be actuated by any method known in the art including a closed-loop VCM, Micro-Electronic Mechanical System (MEMS), or a shape memory alloy (SMA).

In certain embodiments, the imaging device may include a plurality of image sensors 214. Each image sensor 214 may have a corresponding lens 210 and/or aperture 218. In one embodiment, the plurality of image sensors 214 may be the same type of image sensor (e.g., a Bayer sensor). In this implementation, the imaging device 200 may simultaneously capture a plurality of images via the plurality of image sensors 214, which may be focused at different focal depths. In other embodiments, the image sensors 214 may include different image sensor types that produce different information about the captured scene. For example, the different image sensors 214 may be configured to capture different wavelengths of light (infrared, ultraviolet, etc.) other than the visible spectrum.

The depth sensor 216 is configured to estimate the depth of an object to be captured in an image by the imaging device 200. The object may be selected by the user via the user inputting a region corresponding to the object via the input device 290. The depth sensor 216 may be configured to perform a depth estimation using any technique applicable to determining or estimating depth of an object or scene with respect to the imaging device 200, including auto focus techniques for estimating depth such as phase detection auto focus, time-of-flight auto focus, laser auto focus, or dual camera autofocus. The techniques may also be applied using depth or location information received by the imaging device 200 from or about an object within a scene.

The display 280 is configured to display images captured via the lens 210 and the image sensor 214 and may also be utilized to implement configuration functions of the imaging device 200. In one implementation, the display 280 can be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network or a hardwired network. In yet other embodiments, the input device 290 may be a motion sensor which may receive input via tracking of the changing in position of the input device in three dimensions (e.g., a motion sensor used as input for a virtual reality display). The input device 290 may allow the user to select a region of the image via the input of a continuous or substantially continuous line/curve that may form a curve (e.g., a line), a closed loop, or open loop.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

Figure 8:
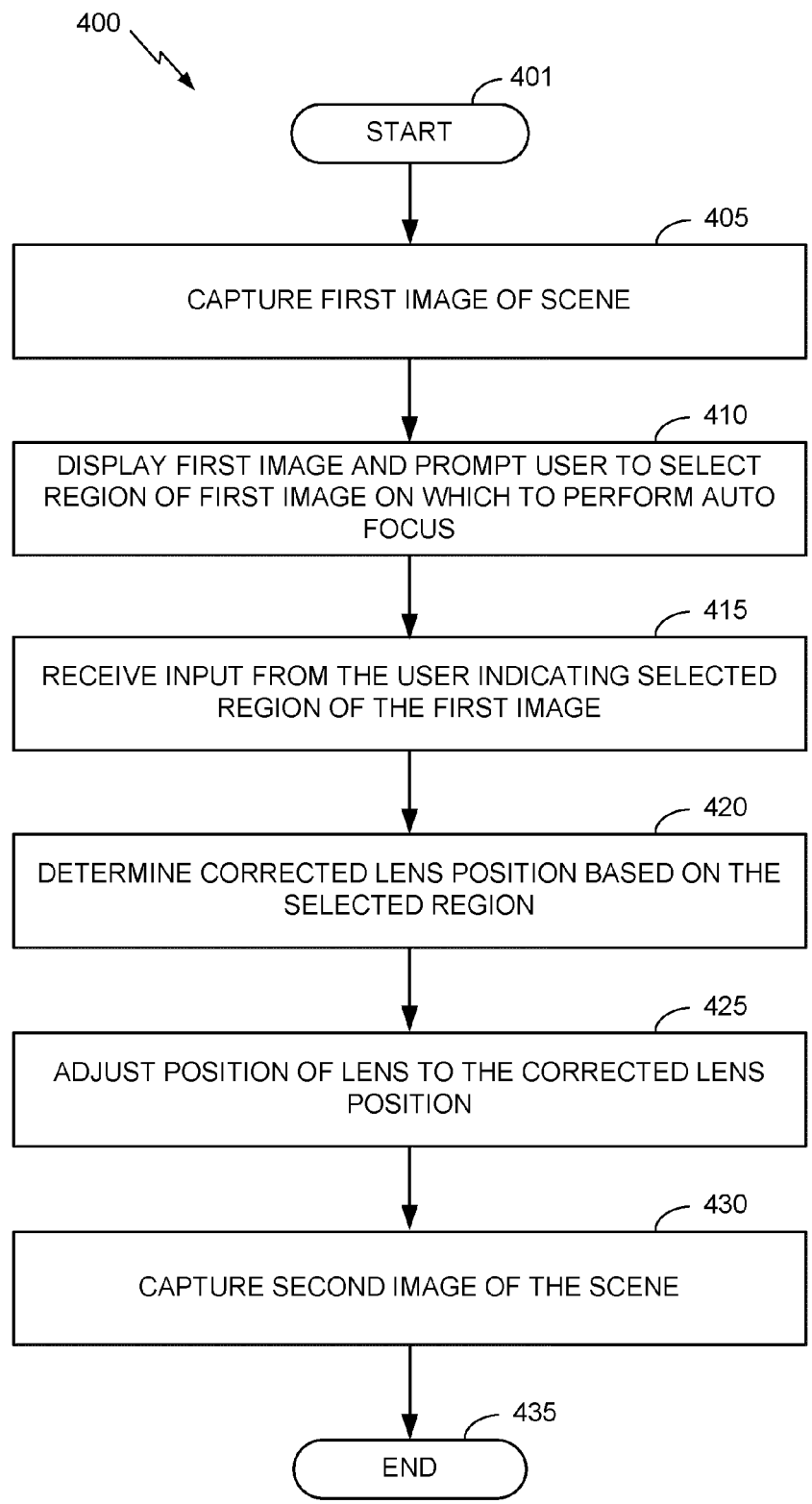
FIG. 8 is a flowchart illustrating an example method operable by an imaging device in accordance with aspects of this disclosure.
Figure 9:
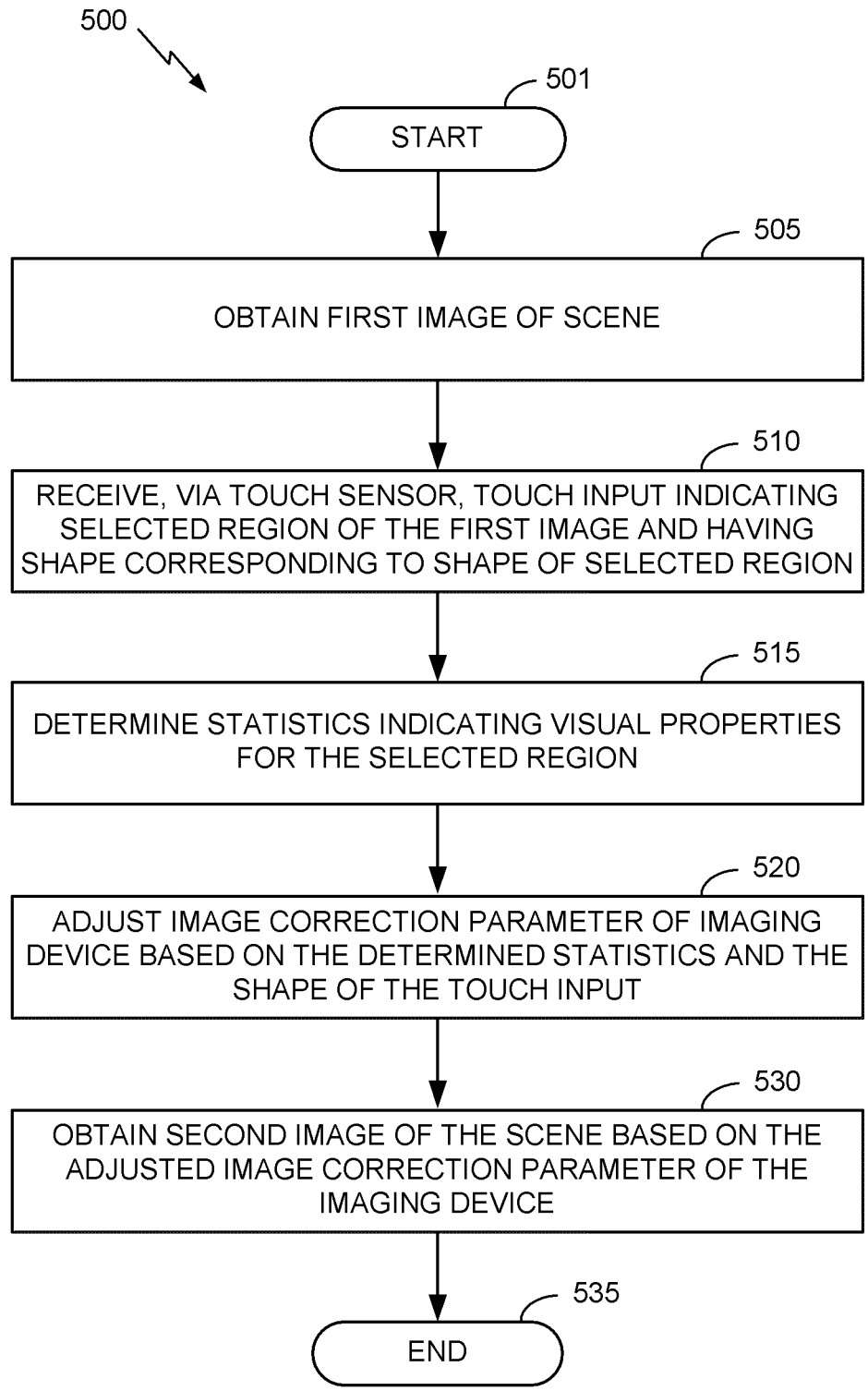
FIG. 9 is a flowchart illustrating another example method operable by an imaging device in accordance with aspects of this disclosure.

The memory 230 may be considered a computer readable medium and stores instructions for instructing the processor 205 to perform various functions in accordance with this disclosure. For example, in some aspects, memory 230 may be configured to store instructions that cause the processor 205 to perform method 400, method 500, or portion(s) thereof, as described below and as illustrated in FIGS. 8 and 9.

In one implementation, the instructions stored in the memory 230 may include instructions for performing auto focus that configure the processor 205 to determine lens positions in a range of lens positions of the lens 210 that may include a desired lens position for capturing an image. The determined lens positions may not include every possible lens position within a range of lens positions, but may include only a subset of the possible lens positions within the range of lens positions. The determined lens positions may be separated by a step size of one or more possible lens positions between determined lens positions. For example, the determined lens positions can include a first lens position at one end of the range of lens positions, the first lens position representing a first focusing distance, and a second lens position at the other end of the range of lens positions, the second lens position representing a second focusing distance. The determined lens positions may further include one or more intermediate lens positions, each intermediate lens position representing a focusing distance between the first and second focusing distances, where the determined lens positions are separated by a step size of one or more possible lens positions between the determined lens positions in the first range of lens positions. In an illustrative embodiment, the processor 205 may determine lens positions in a range of lens positions based at least in part on an estimation of the depth of an object. The instructions may also configure the processor 205 to determine or generate focus values for images captured at one or more lens positions within the range of lens positions. The desired lens position for capturing an image may be a lens position having a maximum focus value. The instructions may also configure the processor 205 to determine or generate a focus value curve or data representative of a focus value curve based on the determined or generated focus values. The instructions may also configure the processor 205 to determine lens positions in a search range of lens positions based at least in part on generated focus values or a focus value curve or data representative of a focus value curve based on a previous search range of lens positions.

Figure 2:
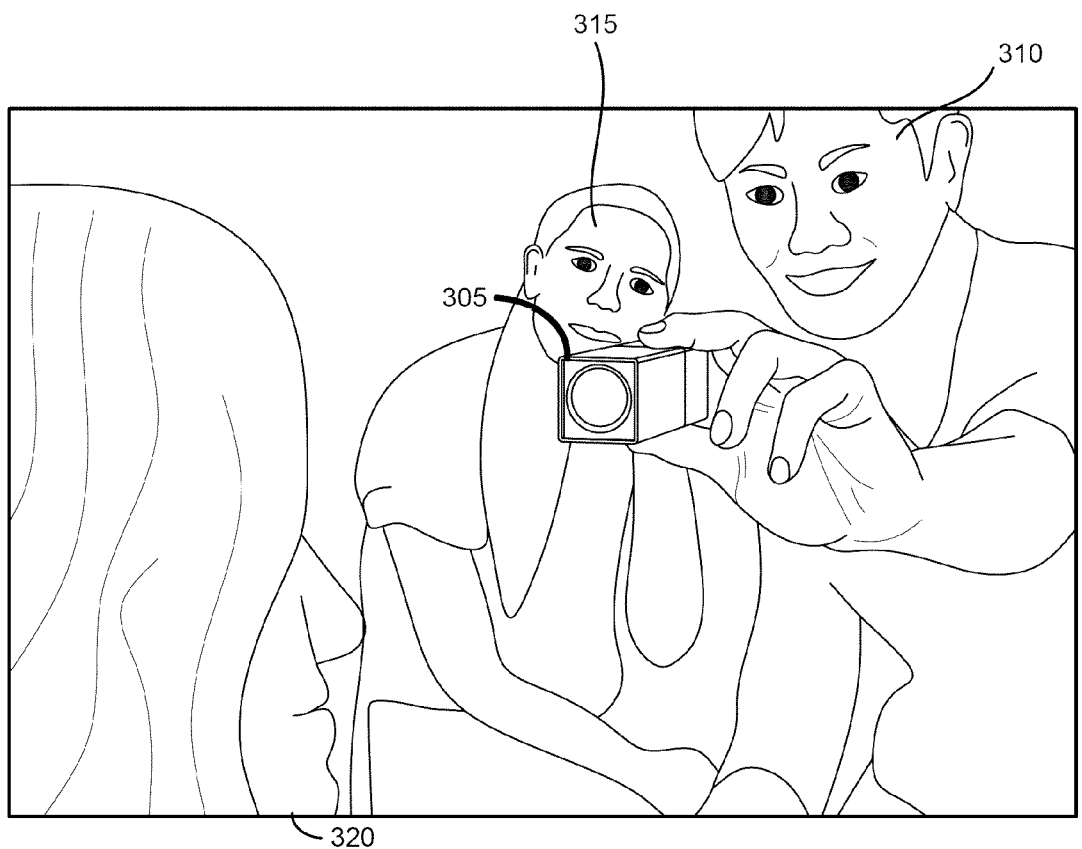
FIG. 2 is an example of a first image captured by an imaging device in accordance with aspects of this disclosure.

Examples of various regions which may be selected by a user for performing auto image correction in accordance with aspects of this disclosure will now be described in connection with FIGS. 2 to 7. FIG. 2 is an example of a first image captured by an imaging device in accordance with aspects of this disclosure. The image of FIG. 2 includes a central object 305 held by a man 310 shown on the right of the image. The central object 305 partially obstructs a woman 315 who is in the background of the image. Additionally, another woman's face 320 can be seen in the foreground on the left side of the image. In the following description connected with FIGS. 2 to 7, the selection of a region by a user may be described in connection with an embodiment of the input device 290 being a touch sensor. However, those skilled in the art will appreciate that the user may also select regions of an image via other input devices 290, for example, via a motion sensor, separate keys or buttons, or via predetermined input received from a network connection (hardwired or wireless).

The image of FIG. 2 may be an image captured using an auto image correction technique. For example, the device located at the center of the image may automatically be selected as a subject with respect to which to perform auto image correction. In the case of auto focus, the processor 205 may determine the focal depth of the object 305 and adjust the position of the lens based on the determined focal depth so as to focus the captured image on the central object 305.

Figure 3:
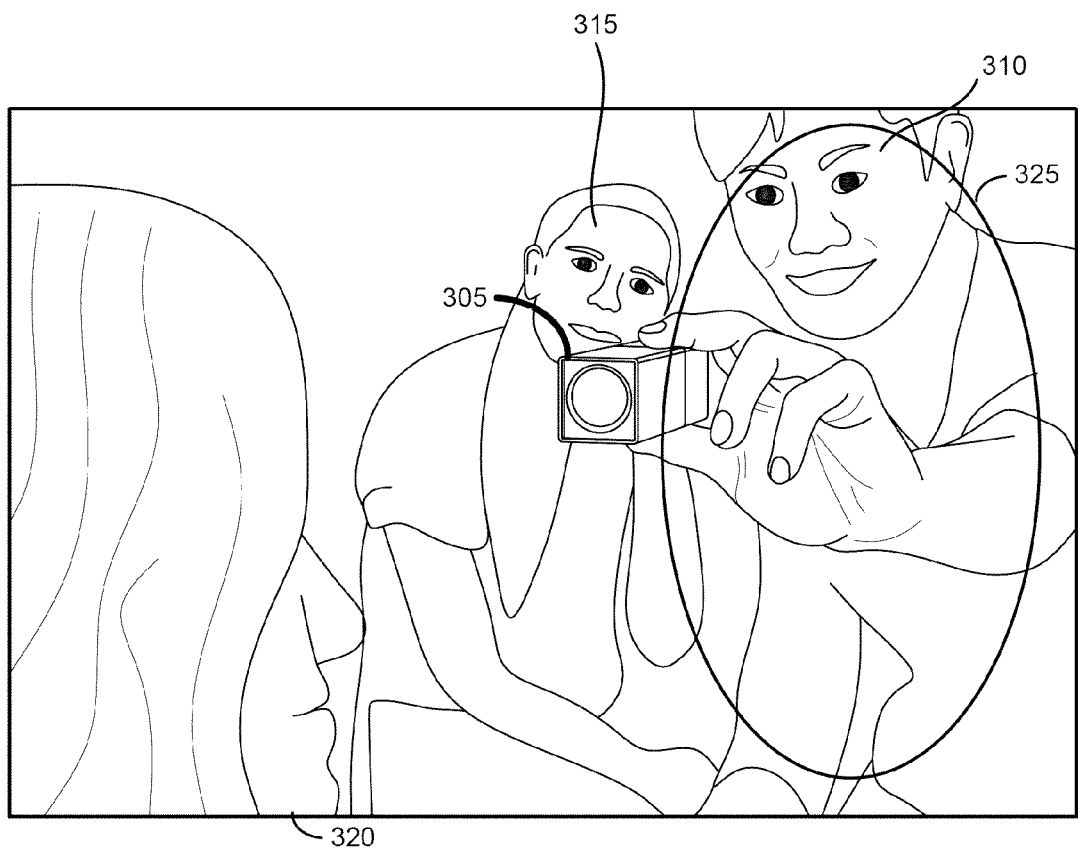
FIG. 3 is an example of a region selected by a user for image correction in accordance with aspects of this disclosure.

In accordance with one or more aspects of the present disclosure, FIG. 3 is an example of a region selected by a user for image correction in accordance with aspects of this disclosure. In the implementation of FIG. 3, the user may select the man 310 shown on the right of the image for auto image correction. This may be accomplished by the user drawing a closed loop 325 around the man 310. Since the closed loop 325 does not include the central object 305, the processor 205 may perform auto image correction based on excluding or reducing the effect of statistics determined from the central object 305 and/or other regions of the captured image. Accordingly, the processor 205 may perform the auto image correction based on the region including the man 310 on the right of the image. In one example of auto focus, the processor 205 may determine a principal focal depth within the selected region of the closed loop 325 or may determine a range of depths for the capture of multiple images within the full depth of focus of the closed loop 325. This will be described in greater detail below in connection with FIG. 8.

Figure 4:
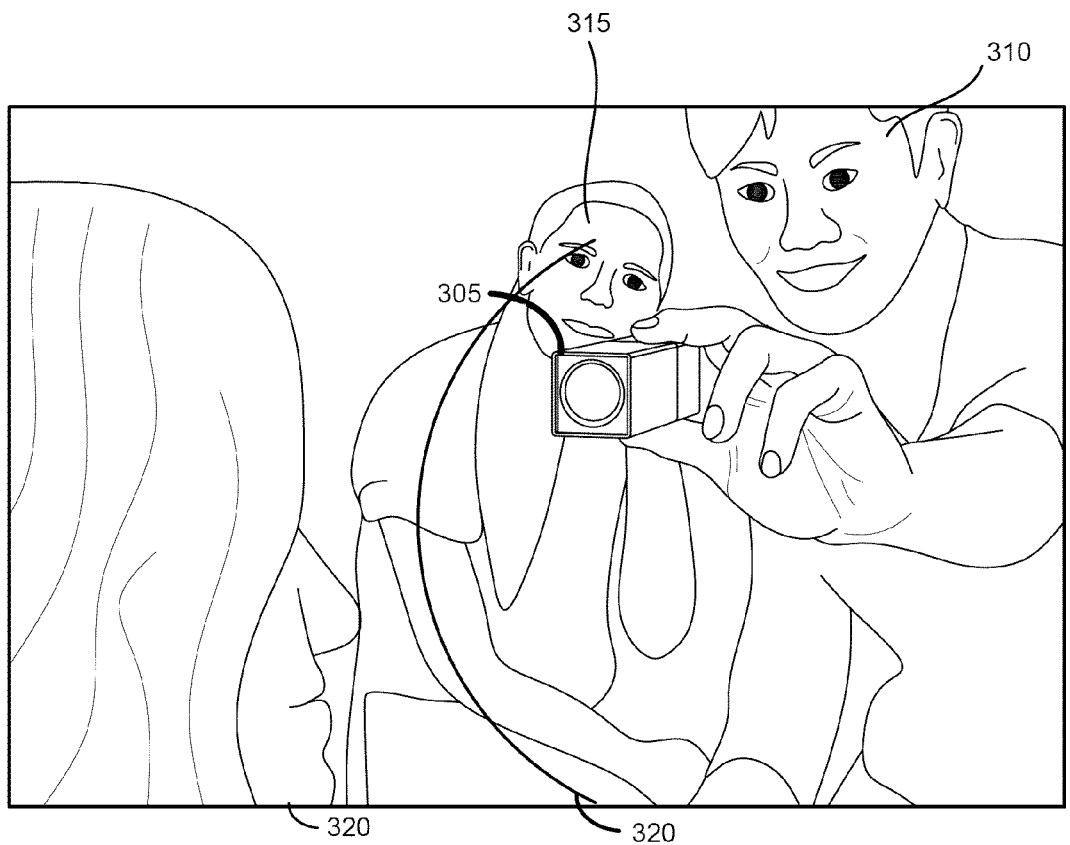
FIG. 4 is another example of a region selected by a user for image correction in accordance with aspects of this disclosure.

FIG. 4 is another example of a region selected by a user for image correction in accordance with aspects of this disclosure. As shown in FIG. 4, the user may select the woman 315 in the background as the region for auto image correction. Since the central object 305 obstructs a significant portion of the woman 315 from view, it may be difficult for the user to draw a closed loop around the woman 315 while excluding the central object 305 from the selection. As such, in the selected region illustrated in FIG. 4, the user may draw a curve or a line 330 overlapping the woman 315 in the background. Since the curve 330 does not overlap the central object 305, the user may be able to easily select the woman 315 without including the central object 305 in the selected region.

Figure 5:
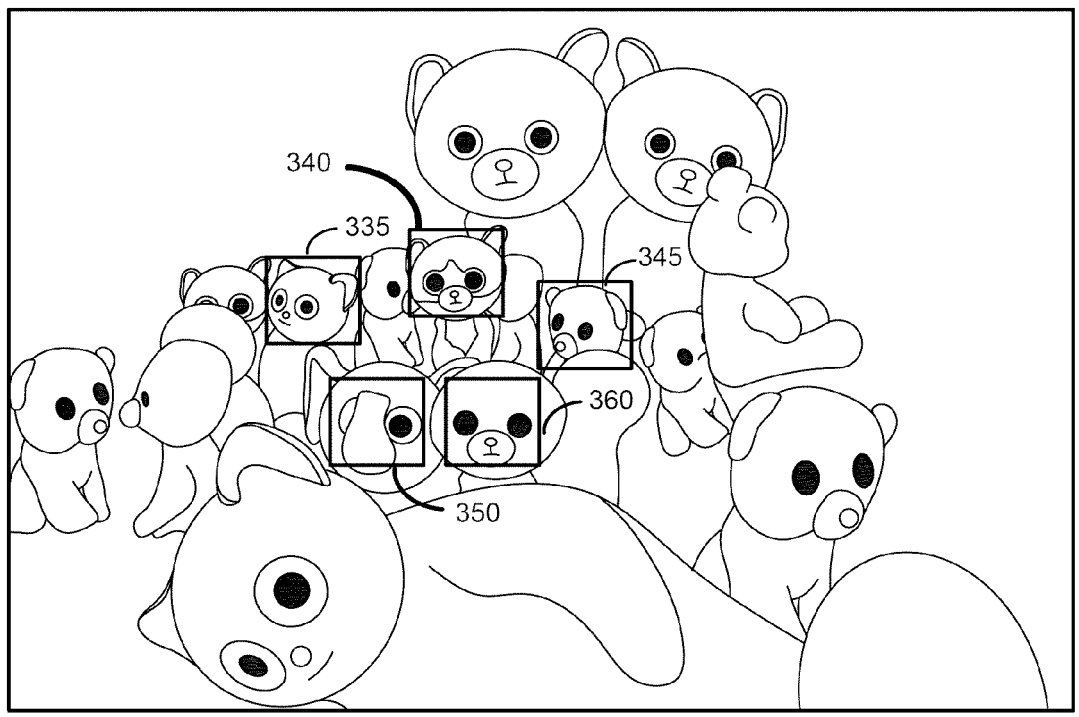
FIG. 5 is yet another example of a region selected by a user for image correction in accordance with aspects of this disclosure.

With reference to FIG. 5, there is shown a region selected by a user for image correction in accordance with aspects of this disclosure. The image of FIG. 5 includes a number of stuffed animals located at different focal depths. In the example of FIG. 5, the user may attempt to select a number of the stuffed animals via multi-touch input 335, 340, 345, 350, and 355 (e.g., by placing five fingers respectively over the desired stuffed animals). It may be difficult for the user to accurately and simultaneously place five fingers over the stuffed animals since they are located near each other within the image.

Figure 6:
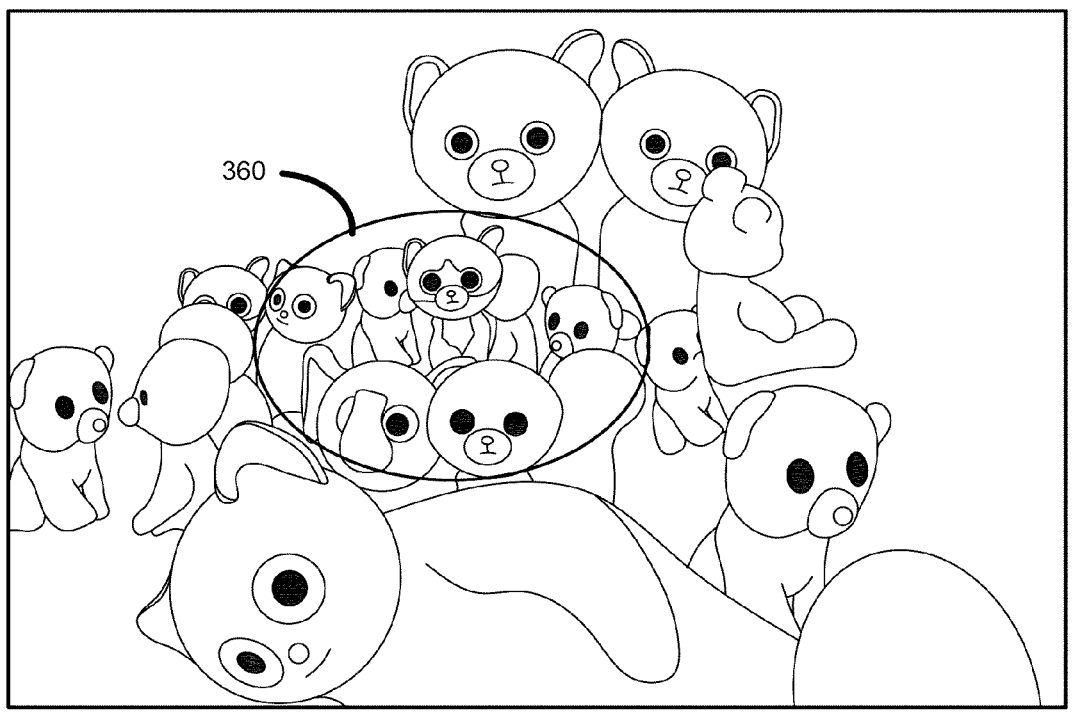
FIG. 6 shows an example of a region including multiple objects selected by a user in accordance with aspects of this disclosure.

In accordance with one or more aspects of the present disclosure, FIG. 6 shows an example of a region including multiple objects selected by a user. As shown in FIG. 6, the user may draw a closed loop 360 around the desired stuffed animals. This may indicate a region to the processor 205 with respect to which to perform auto image correction. The processor 205 may be able to automatically detect, within the selected region, each of the five stuffed animals for more accurate image correction. For example, the processor 205 may perform facial recognition, within only the selected region, to identify the faces of the stuff animals. Depending on the content of the scene, the processor 205 may perform other methods of automatically detecting objects within the selected region which can then be used in the determination of statistics indicting visual properties of the objects as discussed below.

Figure 7:
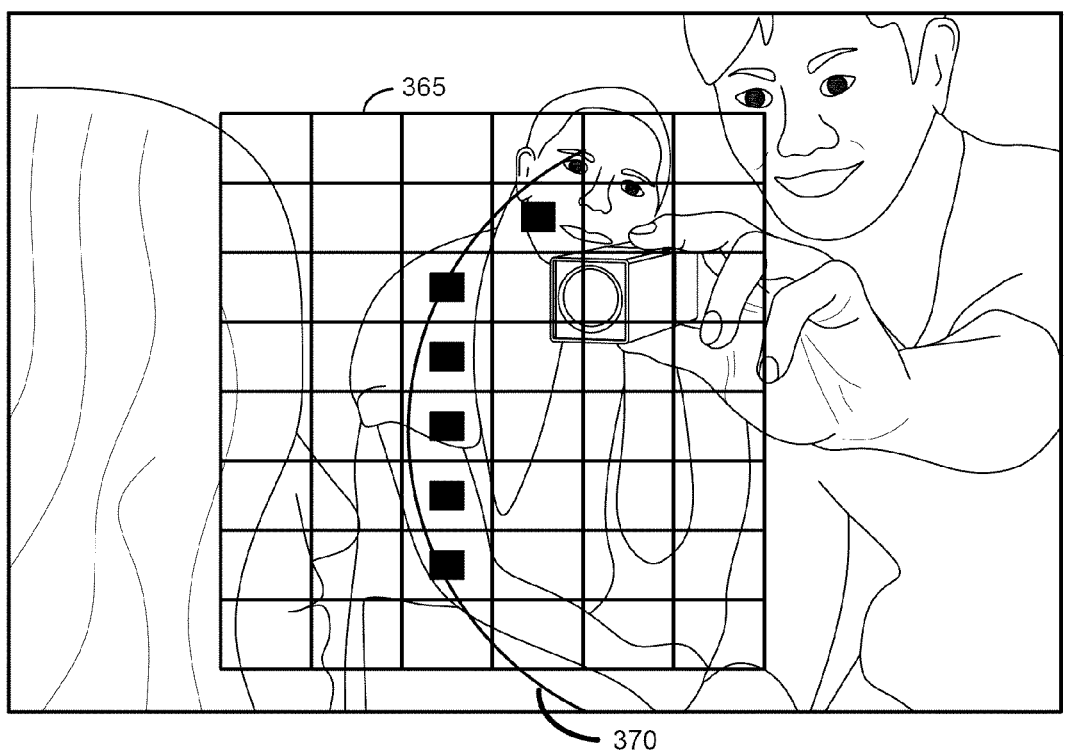
FIG. 7 illustrates an example approach to determining statistics for a selected region of interest in accordance with aspects of this disclosure.

In related aspects, FIG. 7 illustrates an example approach to determining statistics for a selected region of interest, wherein the selected region of interest has an open curved shape 370. As shown in FIG. 7, the processor 205 may divide the captured image into a plurality or grid of blocks 365. The processor 205 may determine statistics for each of the blocks 365. The statistics may depend on the type of auto image correction being performed. For example, during auto focus, the processor 205 may determine a focus value as a statistic for each block 365. The focus value may be a numerical representation of the overall or average focus for the block 365 (e.g., the distance that the block is from optimal focus). In an auto exposure example, the statistics may be a numerical representation of the overall or average brightness, luminance, or saturation of the block 365. In a white balance example, the statistics may be a numerical representation of the overall or average color temperature of the block 365.

The processor 205 may use the statistics as feedback in an auto image correction method. In an example of auto focus, the processor 205 may determine a corrected lens position based on the focus values determined for each block 365. The corrected lens position may be used to determine an amount to move the lens to position the lens 210 in a corrected or optimal lens position. In an example of auto exposure, the processor 205 may determine a corrected aperture size or a corrected shutter speed based on the determined numerical representation of the overall or average brightness, luminance, or saturation of the blocks 365. Similarly, in the auto white balance example, the processor 205 may determine a white balance compensation parameter or color compensation parameter(s) based on the determined numerical representation of the overall or average color temperature of the blocks 365.

In one implementation, the processor 205 may weight the statistics for blocks 365 in the selected region higher than the statistics for the blocks 365 that are not in the selected region. This may allow the auto image correction to emphasize the selected region when performing the auto image correction. In one implementation, the processor 205 may weight the statistics for blocks 365 that are not in the selected region to zero. In this implementation, the processor 205 may not be required to calculate the statistics for blocks 365 that are not in the selected region.

When the user touch input is a curve 370 as shown in FIG. 7, the processor 205 may weight the statistics corresponding the blocks 365 that overlap the curve 370 higher than the statistics corresponding to the remaining blocks 365 of the image. When the user touch input is a closed loop 325 (see FIG. 3), the processor 205 may weight the statistics corresponding the blocks 365 that are within the closed loop 325 or correspond to an area defined by the closed loop 325 higher than the statistics corresponding to the remaining blocks 365 of the image. For example, the processor 205 may weight the statistics corresponding to the blocks that are within the closed loop 325 or correspond to an area defined by the closed loop 325 by 0.8 (e.g., 80%) and weight the statistics corresponding to the remaining blocks 365 by 0.2 (e.g., 20%). In some implementations, as discussed above in connection with FIG. 5, the processor 205 may automatically locate objects within the selected region. In these implementations, the processor 205 may weight statistics for the blocks 365 corresponding to the detected objects higher than the remainder of the selected region.

In one example, when the imaging device 200 has not received the user touch input, the processor 205 may determine a final statistics value according to equation 1:

$$\text{final\_stats} = \sum_{i=1}^{N} weight_i * stats_i \quad (1)$$

Where N is the total number of statistics regions (e.g., blocks) in the image, $stats_i$ are the statistics for the $i^{th}$ region of the image, and $weight_i$ is the weight assigned to the statistics of the $i^{th}$ region.

When the imaging device 200 has received the user touch input, the processor 205 may determine a final statistics value by weighting the statistics according to equation 2:

$$final_{stats} = \sum_{i=1}^{M} weight_i * stats_i + \sum_{i=M+1}^{N} weight_i * stats_i \quad (2)$$

Where M is the total number of user-selected statistics regions, N is the total number of statistics regions (e.g., blocks) in the image, $stats_i$ are the statistics for the $i^{th}$ region of the image, and $weight_i$ is the weight assigned to the statistics of the $i^{th}$ region. In equation 2, the value of M is less than the value of N. Further, the user selected statistics regions may be selected as discussed above (e.g., as the blocks that overlap the user touch input or the blocks that are enclosed by the user touch input).

In another example, the final statistics from all user selected regions may be equally weighted. For example, the user selected regions may be weighted with a $weight_i$ equal to 1/M. In this example, the regions that are not selected by the user may be given a weight of zero. This is shown by equation 3:

$$final_{stats} = \sum_{i=1}^{M} \frac{1}{M} * stats_i + \sum_{i=M+1}^{N} 0 * stats_i \quad (3)$$

Although the above has been described in connection with a single image sensor 214, aspects of this disclosure may also be adapted for use by an imaging device 200 including a plurality of image sensors 214. For example, the imaging device 200 may include a plurality of the same type of image sensors 214. In this example, when the imaging device 200 receives the touch input from the user (e.g., the open curve, line, or closed loop), the touch input may indicate a region of the image including a plurality of focus depths. The processor 205 may determine a plurality of principal depths based on the region and the image sensors 214 may respectively capture images of the scene at the determined principal depths. In one implementation, this may be accomplished by the processor 205 determining weighted final statistics for each of the blocks in the selected region and determining a number of principal depths of the selected region based on the weighted final statistics. The image sensors 214 may simultaneously capture an image at each of the principal depths.

In another example, the imaging device 200 may include a plurality of image sensors 214 that capture different types of information from a scene. The different image sensors 214 may be configured to capture additional information of the selected region based on the spectrum(s) of light that may be captured by the image sensors 214. One implementation of an imaging device 200 including the different image sensors 214 may be a drone which may perform feature extraction and focus on the region selected by the user. For example, the processor 205 may determine weighted final statistics for each of the blocks in the selected region. The image sensors 214 may zoom in on the selected region and capture a new set of images. The processor 205 may determine more detailed weighted final statistics for each of the blocks in the selected region based on the zoomed-in captured images. The drone may reposition itself and the image sensors 214 for a better view of the selected region based on the detailed statistics and capture subsequent images of the selected region.

Example Flowcharts for Irregular Region Auto Focus

An exemplary implementation of this disclosure will now be described in the context of an auto focus procedure. It should be noted, however, that auto focus is merely described as an exemplary auto image correction procedure, and the method 400 described in connection with FIG. 8 may be modified to be applicable to other auto image correction procedures, such as auto exposure and auto white balance.

FIG. 8 is a flowchart illustrating an example method operable by an imaging device 200, or component(s) thereof, for auto focus in accordance with aspects of this disclosure. For example, the steps of method 400 illustrated in FIG. 8 may be performed by a processor 205 of the imaging device 200. For convenience, method 400 is described as performed by the processor 205 of the imaging device 200.

The method 400 begins at block 401. At block 405, the processor 205 captures a first image of a scene. At block 401, the processor 205 displays the first image on a display 280 and prompts a user of the imaging device 200 to select a region of the first image on which to perform auto focus. At block 415, the processor 205 receives input from the user indicating a selected region of the first image. The processor 205 may receive the input from the user via an input device 290, such as a touch sensor. At block 420, the processor 205 may determine a corrected lens position based on the selected region. In some implementations, this may involve the processor 205 dividing the first image into a plurality of blocks, determining a focus value for each of the blocks, and/or determining a corrected lens position based on weighting the focus values for the blocks in the selected region greater than the blocks that are not in the selected region.

At block 425, the processor 205 adjusts the position of the lens to the corrected position. At block 430, the processor 205 captures a second image of the scene at the corrected lens position. In some implementations, this may include a feedback loop where the processor 205 captures an intermediate image, re-determines the focus value, and if the focus value is not greater than a threshold focus value, re-determines the corrected lens position. Once the processor 205 determines that the focus value for the intermediate image is greater than the threshold focus value, the processor 205 may determine that the selected region is at an optimal or acceptable focus level. The method ends at block 435.

In certain implementations, the selected region may comprise a plurality of focal depths (e.g., the object(s) within the selected region may be located at different depths from the imaging device 200). In this case, the processor 205 may capture a plurality of second images of the scene at a plurality of intervals within the range of depths of the selected region. This may allow the user to select one of the images from the plurality of captured second images to be saved to memory 230. Alternatively, the processor 205 may perform post-processing on the second images to create a composite image where the entirety or majority of the selected region is within focus.

FIG. 9 is a flowchart illustrating another example method operable by an imaging device in accordance with aspects of this disclosure. The steps illustrated in FIG. 9 may be performed by an imaging device 200 or component(s) thereof. For example, the method 500 may be performed by a processor 205 of the imaging device 200. For convenience, the method 500 is described as performed by the processor 205 of the imaging device.

The method 500 begins at block 501. At block 505, the processor 205 obtains a first image of a scene. The processor 205 obtaining the first image may include receiving the first image from an image sensor 214 of the imaging device 200. The image sensor 214 may generate images of the scene based on light received via a lens 210. At block 510, the processor 205 receives, via a touch sensor (e.g., the input device 290), a touch input indicating a selected region of the first image and having a shape corresponding to a shape of the selected region. The touch input may be input to the touch sensor by a user of the imaging device 200. The user touch input may be an open curve (such as a line) or a closed loop drawn by the user on the touch input.

At block 515, the processor 205 determines statistics indicating visual properties for the selected region. The processor 205 may also determines statistics indicating visual properties for the remaining region of the first image. At block 520, the processor 205 adjusts an image correction parameter of the imaging device 200 based on the determined statistics and the shape of the touch input. At block 530, the processor obtains a second image of the scene based on the adjusted image correction parameter of the imaging device 200. The processor 205 obtaining the second image may include receiving the second image from the image sensor 214 of the imaging device 200 or generating the second image via image processing. The method ends at block 535.

Other Considerations

In some embodiments, the circuits, processes, and systems discussed above may be utilized in a wireless communication device, such as apparatus 100. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may include random-access memory (RAM), read-only memory (ROM), electrically erasable programmable read-only memory (EEPROM), flash memory or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method, operable by an imaging device including a touch sensor, for performing image correction, the method comprising:
    obtaining a first image of a scene, the first image being divided into a plurality of blocks;
    receiving, via the touch sensor, a user-drawn input indicating a selected region of the first image and having a shape that corresponds to a shape of the selected region;
    determining statistics indicating visual properties for each of the blocks;
    determining that the shape of the user-drawn input comprises an open curve;
    weighting the statistics for blocks of the first image that overlap the open curve higher than blocks of the first image that do not overlap the open curve;
    adjusting at least one image correction parameter of the imaging device based on the weighted statistics; and
    obtaining a second image of the scene based on the adjusted at least one image correction parameter of the imaging device.

2. The method of claim 1, wherein the at least one image correction parameter of the imaging device comprises one or more of: a position of a lens, a size of an aperture, a shutter speed, and a white balance compensation parameter.

3. The method of claim 1, wherein the method further comprises defining the selected region as an area of the first image corresponding to the user-drawn input based on the shape of the user-drawn input.

4. The method of claim 1, further comprising:
    receiving, via the touch sensor, a second user-drawn input indicating a second selected region of the first image and having a shape that corresponds to a shape of the second selected region;
    determining that the shape of the second user-drawn input comprises a closed loop; and
    weighting the statistics for blocks of the grid that are enclosed by the closed loop higher than blocks of the grid that are not enclosed by the selected region.

5. The method of claim 1, wherein the at least one image correction parameter of the imaging device comprises a position of a lens, the method further comprising:
    determining a plurality of positions of the lens respectively corresponding to different focal depths of the selected region; and receiving a third image at each of the determined positions of the lens.

6. The method of claim 1, wherein the at least one image correction parameter of the imaging device comprises a position of a lens, the method further comprising:
    detecting at least one object within the selected region;
    determining the position of the lens corresponding to a focal depth of the object; and
    adjusting the position of the lens based on the determined position of the lens.

7. An imaging device, comprising:
an image sensor;
a display;
a touch sensor;
at least one processor; and
a memory storing computer-executable instructions for controlling the at least one processor to:
    obtain a first image of a scene from the image sensor, the first image being divided into a plurality of blocks;
    control the display to display the first image;
    receive, from the touch sensor, a user-drawn input indicating a selected region of the first image and having a shape that corresponds to a shape of the selected region;
    determine statistics indicating visual properties for each of the blocks;
    determine that the shape of the user-drawn input comprises an open curve;
    weight the statistics for blocks of the first image that overlap the open curve higher than blocks of the first image that do not overlap the open curve;
    adjust at least one image correction parameter of the imaging device based on the weighted statistics; and
    obtain a second image of the scene based on the adjusted at least one image correction parameter of the imaging device.

8. The imaging device of claim 7, wherein the at least one image correction parameter of the imaging device comprises one or more of: a position of a lens, a size of an aperture, a shutter speed, and a white balance compensation parameter.

9. The imaging device of claim 7, wherein the computer-executable instructions are further for controlling the at least one processor to define the selected region as an area of the first image corresponding to the user-drawn input based on the shape of the user-drawn input.

10. The imaging device of claim 7, wherein the computer-executable instructions are further for controlling the at least one processor to:
    receive, via the touch sensor, a second user-drawn input indicating a second selected region of the first image and having a shape that corresponds to a shape of the second selected region;
    determine that the shape of the second user-drawn input comprises a closed loop; and
    weight the statistics for blocks of the grid that are enclosed by the closed loop higher than blocks of the grid that are not enclosed by the selected region.

11. The imaging device of claim 7, wherein the at least one image correction parameter of the imaging device comprises a position of a lens, the computer-executable instructions being further for controlling the at least one processor to:
    determine a plurality of positions of the lens respectively corresponding to different focal depths of the selected region; and
    receive a third image at each of the determined positions of the lens.

12. The imaging device of claim 7, wherein the at least one image correction parameter of the imaging device comprises a position of a lens, the computer-executable instructions being further for controlling the at least one processor to:
    detect at least one object within the selected region;
    determine the position of the lens corresponding to a focal depth of the object; and
    adjust the position of the lens based on the determined position of the lens.

13. An apparatus, comprising:
    means for obtaining a first image of a scene, the first image being divided into a plurality of blocks;
    means for receiving a user-drawn input indicating a selected region of the first image and having a shape that corresponds to a shape of the selected region;
    means for determining statistics indicating visual properties for each of the blocks;
    means for determining that the shape of the user-drawn input comprises an open curve;
    means for weighting the statistics for blocks of the first image that overlap the open curve higher than blocks of the first image that do not overlap the open curve;
    means for adjusting at least one image correction parameter of an imaging device based on the weighted statistics; and
    means for obtaining a second image of the scene based on the adjusted at least one image correction parameter of the imaging device.

14. The apparatus of claim 13, wherein the at least one image correction parameter of the imaging device comprises one or more of: a position of a lens, a size of an aperture, a shutter speed, and a white balance compensation parameter.

15. The apparatus of claim 13, wherein the apparatus further comprises means for defining the selected region as an area of the first image corresponding to the user-drawn input based on the shape of the user-drawn input.

16. The apparatus of claim 13, further comprising:
    means for receiving, via the touch sensor, a second user-drawn input indicating a second selected region of the first image and having a shape that corresponds to a shape of the second selected region;
    means for determining that the shape of the second user-drawn input comprises a closed loop; and
    means for weighting the statistics for blocks of the grid that are enclosed by the closed loop higher than blocks of the grid that are not enclosed by the selected region.

17. The apparatus of claim 13, wherein the at least one image correction parameter of the imaging device comprises a position of a lens, the apparatus further comprising:
    means for determining a plurality of positions of the lens respectively corresponding to different focal depths of the selected region; and
    means for receiving a third image at each of the determined positions of the lens.

18. The apparatus of claim 13, wherein the at least one image correction parameter of the imaging device comprises a position of a lens, the apparatus further comprising:
    means for detecting at least one object within the selected region;
    means for determining the position of the lens corresponding to a focal depth of the object; and
    means for adjusting the position of the lens based on the determined position of the lens.

19. A non-transitory computer readable storage medium having stored thereon instructions that, when executed, cause a processor of a device to:
- obtain a first image of a scene, the first image being divided into a plurality of blocks;
- receive, via a touch sensor, a user-drawn input indicating a selected region of the first image and having a shape that corresponds to a shape of the selected region;
- determine statistics indicating visual properties for each of the blocks;
- determine that the shape of the user-drawn input comprises an open curve;
- weight the statistics for blocks of the first image that overlap the open curve higher than blocks of the first image that do not overlap the open curve;
- adjust at least one image correction parameter of an imaging device based on the weighted statistics; and
- obtain a second image of the scene based on the adjusted at least one image correction parameter of the imaging device.

20. The non-transitory computer readable storage medium of claim 19, wherein the at least one image correction parameter of the imaging device comprises one or more of: a position of a lens, a size of an aperture, a shutter speed, and a white balance compensation parameter.

21. The non-transitory computer readable storage medium of claim 19, wherein the non-transitory computer readable storage medium further has stored thereon instructions that, when executed, cause the processor to define the selected region as an area of the first image corresponding to the user-drawn input based on the shape of the user-drawn input.

22. The non-transitory computer readable storage medium of claim 19, further having stored thereon instructions that, when executed, cause the processor to:
- receive, via the touch sensor, a second user-drawn input indicating a second selected region of the first image and having a shape that corresponds to a shape of the second selected region;
- determine that the shape of the second user-drawn input comprises a closed loop; and
- weight the statistics for blocks of the grid that are enclosed by the closed loop higher than blocks of the grid that are not enclosed by the selected region.

* * * * *